US012689407B2

(12) United States Patent (10) Patent No.: US 12,689,407 B2

Fukumoto et al. (45) Date of Patent: Jul. 21, 2026

(54) TIMING DETECTION METHOD, COMMUNICATION SYSTEM AND RECEIVING APPARATUS

(71) Applicant: NTT, Inc., Tokyo (JP)

(72) Inventors: Hiroyuki Fukumoto, Musashino (JP); Seiji Omori, Musashino (JP); Yosuke Fujino, Musashino (JP); Miharu Oiwa, Musashino (JP); Ryota Okumura, Musashino (JP); Yuya Ito, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/858,593

(22) PCT Filed: Apr. 27, 2022

(86) PCT No.: PCT/JP2022/019061

§ 371 (c)(1),
(2) Date: Oct. 21, 2024

(87) PCT Pub. No.: WO2023/209864

PCT Pub. Date: Nov. 2, 2023

(65) Prior Publication Data

US 2025/0266860 A1 Aug. 21, 2025

(51) Int. Cl.
*H04B 1/7073* (2011.01)
*H04L 27/22* (2006.01)
(52) U.S. Cl.
CPC ........... *H04B 1/7073* (2013.01); *H04L 27/22* (2013.01)

(58) Field of Classification Search
CPC .............................. H04B 1/7073; H04L 27/22
USPC ......................................................... 375/150
See application file for complete search history.

(56) References Cited

U.S. PATENT DOCUMENTS

| | | | |
|---|---|---|---|
| 7,764,751 B1 * | 7/2010 | Hammell | ................ G01S 7/352 |
| | | | 375/343 |
| 2007/0165488 A1 * | 7/2007 | Wildey | ................... G01F 1/002 |
| | | | 367/101 |
| 2020/0371247 A1 * | 11/2020 | Marmet | ................ G01S 19/015 |

OTHER PUBLICATIONS

Milica Stojanovic et al., "Phase-Coherent Digital Communications for Underwater Acoustic Channels", IEEE Journal of Oceanic Engineering, vol. 19, No. 1, Jan. 1994, pp. 100-111.

* cited by examiner

*Primary Examiner* — Kevin M Burd

(74) *Attorney, Agent, or Firm* — Harness, Dickey & Pierce, PLC

(57) ABSTRACT

The transmission apparatus intermittently transmits a physical frame of a transmitted signal. The receiving apparatus includes a correlation calculation unit and a determination unit. The correlation calculation unit calculates a correlation between the received signal and each of the correlation sequences subjected to Doppler shift of a plurality of types of shift amounts. The determination unit determines that the physical frame has been received in a case where any one of the calculation results obtained by the correlation calculation unit exceeds the threshold.

6 Claims, 8 Drawing Sheets

<u>RELATED ART</u>

TIMING DETECTION METHOD, COMMUNICATION SYSTEM AND RECEIVING APPARATUS

CROSS-REFERENCE TO RELATED APPLICATIONS

This application is a 371 U.S. National Phase of International Application No. PCT/JP2022/019061, filed on Apr. 27, 2022. The entire disclosure of the above application is incorporated herein by reference.

TECHNICAL FIELD

The present invention relates to a timing detection method, a communication system, and a receiving apparatus.

BACKGROUND ART

In a communication system that performs transmission and reception in units of packets, it is necessary to accurately find a head position of a physical frame in order to perform synchronization processing. However, since there is impulse noise underwater, the timing of the impulse noise is often erroneously detected. In order to prevent erroneous timing detection in an environment with impulse noise, a relatively long correlation sequence may be embedded in a received signal, and frame timing detection may be performed by cross-correlation (e.g., refer to Non Patent Literature 1).

CITATION LIST

Non Patent Literature

Non Patent Literature 1: M. Stojanovic, J. A. Catipovic and J. G. Proakis, "Phase-coherent digital communications for underwater acoustic channels," in IEEE Journal of Oceanic Engineering, vol. 19, no. 1, pp. 100-111, January 1994, doi: 10.1109/48.289455

SUMMARY OF INVENTION

Technical Problem

The possibility of falsely detecting the impulse noise as the frame timing decreases as the correlation sequence becomes longer. On the other hand, the cross-correlation value between the Doppler-shifted received signal and the correlation sequence decreases as the correlation sequence becomes longer.

FIG. 6 is a diagram illustrating the detection performance of a conventional technology. FIG. 6 illustrates, as detection performance, a relationship between a moving speed and a cross-correlation value at the time of physical frame reception detection in the conventional technology. As the cross-correlation value, a normalized signal to noise ratio (SNR) is used. Reference sign L denotes a detectable level. When the cross-correlation value exceeds the detectable level L, the reception of the physical frame can be detected. Reference sign G11 denotes a cross-correlation value in a case where the sequence length is 25 ms, and reference sign G12 denotes a detectable range in a case where the sequence length is 25 ms. Reference sign G21 denotes a cross-correlation value in a case where the sequence length is 100 ms, and reference sign G22 denotes a detectable range in a case where the sequence length is 100 ms. As illustrated in FIG. 6, the cross-correlation value around the moving speed of 0 m/s becomes larger and the SNR is more improved as the sequence length becomes longer. This indicates that resistance to impulse noise is increased. On the other hand, the range of the moving speed in which the reception of the physical frame can be detected becomes narrower as the sequence length becomes longer.

In this way, it becomes difficult to detect the timing in a mobile environment if the correlation sequence is lengthened in order to improve the impulse noise resistance.

In view of the above circumstances, an object of the present invention is to provide a timing detection method, a communication system, and a receiving apparatus that improve the detection accuracy of a received signal in a mobile environment while preventing decrease in impulse noise resistance.

Solution to Problem

A timing detection method according to an aspect of the present invention includes: a transmission step of intermittently transmitting a physical frame of a transmitted signal by a transmission apparatus; a correlation calculation step of calculating, by a receiving apparatus, a correlation between a received signal and each of correlation sequences subjected to Doppler shift of a plurality of types of shift amounts; and a determination step of determining, by the receiving apparatus, that the physical frame has been received in a case where any one of calculation results obtained in the correlation calculation step exceeds a threshold.

A timing detection method according to an aspect of the present invention includes: a correlation calculation step of calculating a correlation between a received signal and each of correlation sequences subjected to Doppler shift of a plurality of types of shift amounts; and a determination step of determining that a physical frame transmitted from a transmission apparatus that intermittently transmits a physical frame of a transmitted signal has been received in a case where any one of calculation results obtained in the correlation calculation step exceeds a threshold.

An aspect of the present invention is a communication system including a transmission apparatus and a receiving apparatus, in which the transmission apparatus intermittently transmits a signal frame, and the receiving apparatus includes: a correlation calculation unit (hereinafter also referred to as "correlation calculation circuitry") that calculates a correlation between a received signal and each of correlation sequences subjected to Doppler shift of a plurality of types of shift amounts; and a determination unit (hereinafter also referred to as "determination circuitry") that determines that a physical frame has been received in a case where any one of calculation results obtained by the correlation calculation unit exceeds a threshold.

A receiving apparatus according to an aspect of the present invention includes: a correlation calculation unit that calculates a correlation between a received signal and each of correlation sequences subjected to Doppler shift of a plurality of types of shift amounts; and a determination unit that determines that a physical frame transmitted from a transmission apparatus that intermittently transmits a physical frame of a transmitted signal has been received in a case where any one of calculation results obtained by the correlation calculation unit exceeds a threshold.

Advantageous Effects of Invention

According to the present invention, it is possible to improve the detection accuracy of a received signal in a mobile environment while preventing decrease in impulse noise resistance.

DESCRIPTION OF EMBODIMENTS

Hereinafter, an embodiment of the present invention will be described in detail with reference to the drawings.

A communication system according to the present embodiment improves the detection accuracy of physical frame reception in a mobile environment while preventing decrease in impulse noise resistance without shortening the correlation sequence. As a result, the communication system according to the present embodiment accurately detects the reception timing of the physical frame of the signal even in an environment where impulse noise exists.

Figure 1:
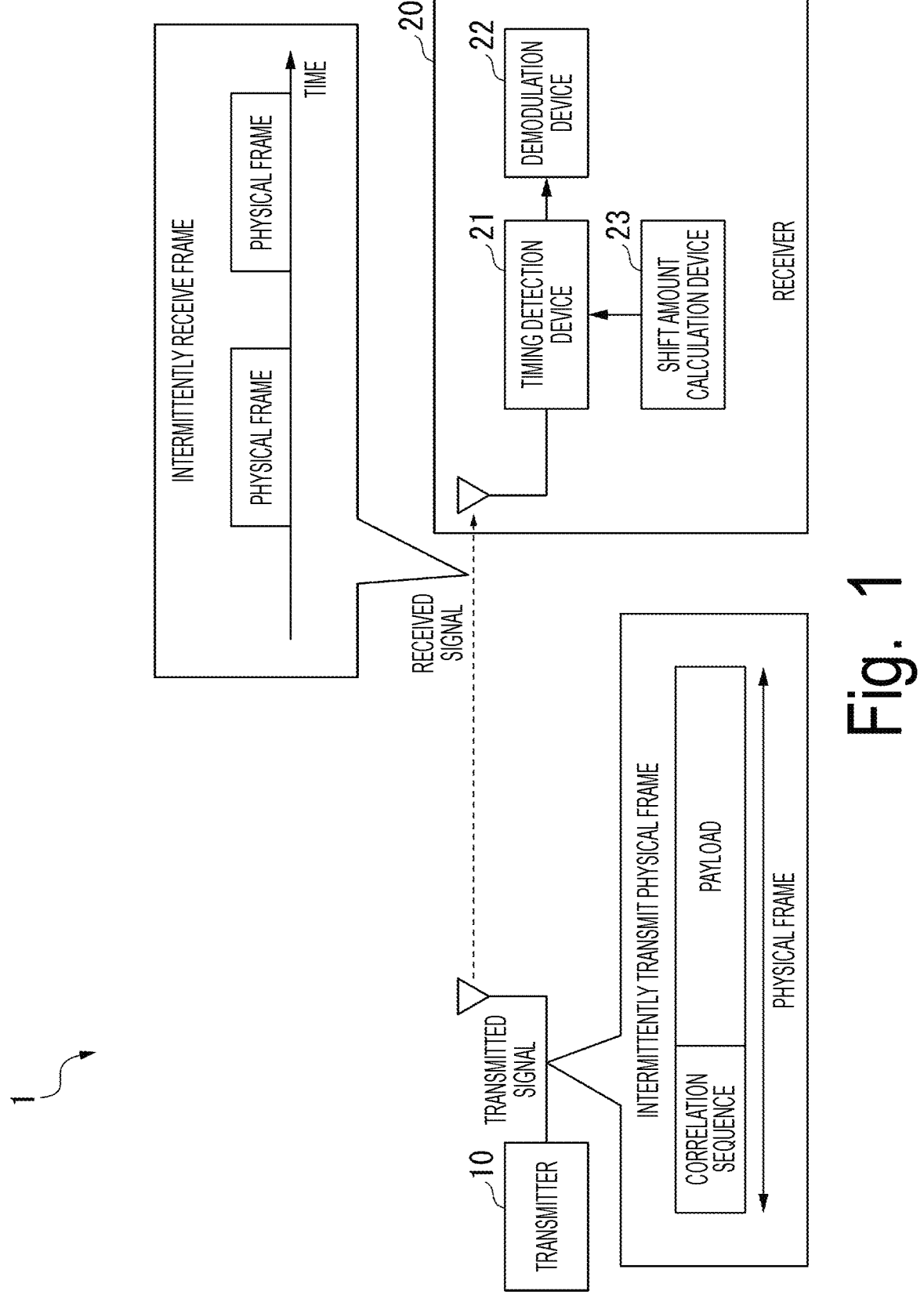
FIG. 1 is a configuration diagram of a communication system according to an embodiment of the present invention.

FIG. 1 is a diagram illustrating a configuration of a communication system 1 according to an embodiment of the present invention. The communication system 1 includes a transmitter 10 and a receiver 20. The communication system 1 is, for example, an underwater communication system that performs underwater communication. In the case of performing underwater communication, the receiver 20 receives a signal transmitted underwater from the transmitter 10.

The transmitter 10 intermittently transmits physical frames of transmitted signals from an antenna. The physical frame includes a payload and a correlation sequence. The correlation sequence is set at a predetermined position of the physical frame. In the present embodiment, a correlation sequence is set at the head of a physical frame. The correlation sequence is known.

The receiver 20 intermittently receives, by an antenna, the physical frames intermittently transmitted from the transmitter 10. The receiver 20 includes a timing detection device 21, a demodulation device 22, and a shift amount calculation device 23.

The timing detection device 21 calculates a correlation between the received signal received by the antenna and each of correlation sequences subjected to Doppler shift of a plurality of types of Doppler shift amounts, and detects the reception of the physical frame on the basis of the calculation results. The timing detection device 21 notifies the demodulation device 22 of the received signal and the detection position of the physical frame in the received signal.

The demodulation device 22 specifies the position of the payload in the received signal on the basis of the detection position of the physical frame detected by the timing detection device 21. In a case where the correlation sequence is included at the head of the physical frame, the detection position in notification from the timing detection device 21 represents the head of the physical frame in the received signal. The demodulation device 22 demodulates a portion of the received signal corresponding to the payload of the physical frame to obtain the information transmitted by the transmitter 10.

The shift amount calculation device 23 calculates a plurality of types of Doppler shift amounts to be applied to the correlation sequence used by the timing detection device 21. Note that the shift amount calculation device 23 may be provided outside the receiver 20. Moreover, the receiver 20 may not include the shift amount calculation device 23. In this case, the timing detection device 21 uses a plurality of predetermined types of Doppler shift amounts set in advance.

Figure 7:
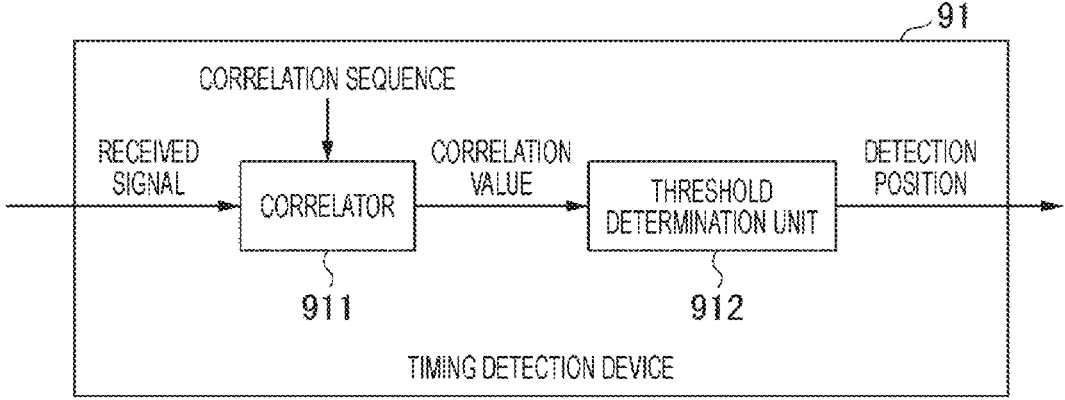
FIG. 7 is a block diagram illustrating a configuration of a conventional timing detection device.

Here, a conventional technology will be described. FIG. 7 is a diagram illustrating a configuration of a conventional timing detection device 91. The timing detection device 91 includes a correlator 911 and a threshold determination unit 912. The correlator 911 calculates a correlation value between the received signal and the correlation sequence. The threshold determination unit 912 detects the reception of the physical frame by comparing the correlation value with the threshold.

Figure 8:
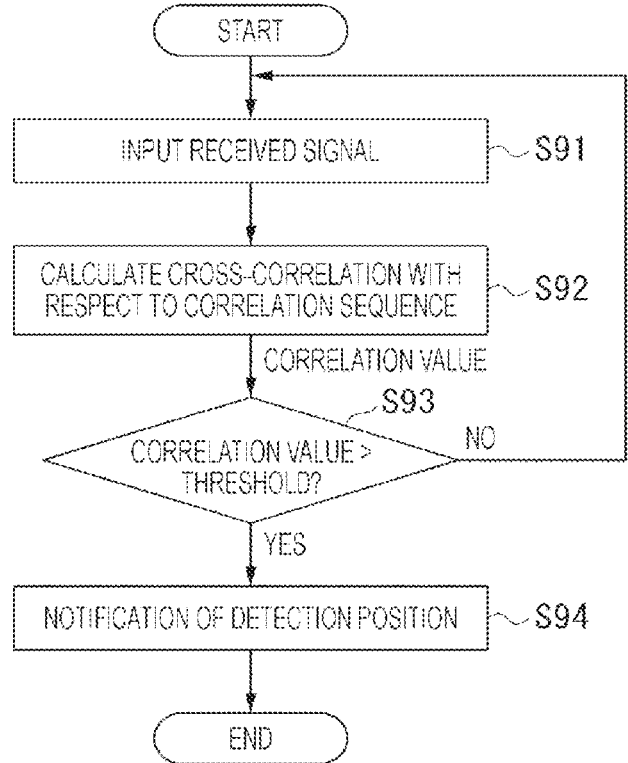
FIG. 8 is a flowchart illustrating reception timing detection processing by a conventional timing detection device.

FIG. 8 is a flowchart illustrating reception timing detection processing by the timing detection device 91. The correlator 911 inputs a received signal (step S91). The correlator 911 calculates cross-correlation between the received signal and the known correlation sequence (step S92). The threshold determination unit 912 determines whether the correlation value of the cross-correlation calculated in step S92 is larger than a threshold or not (step S93).

When determining that the correlation value is smaller than or equal to the threshold (step S93: NO), the threshold determination unit 912 repeats the processing from step S91 for a received signal at the next timing. When determining that the correlation value is larger than the threshold (step S93: YES), the threshold determination unit 912 detects the reception of the physical frame. When the correlation sequence is at the head of the physical frame, the threshold determination unit 912 notifies the subsequent stage of the head position of the received signal inputted in step S91 as the detection position of the physical frame (step S94).

In the case of the timing detection device 91, in principle, it is more difficult to detect the Doppler-shifted received signal as the correlation sequence becomes longer.

Figure 2:
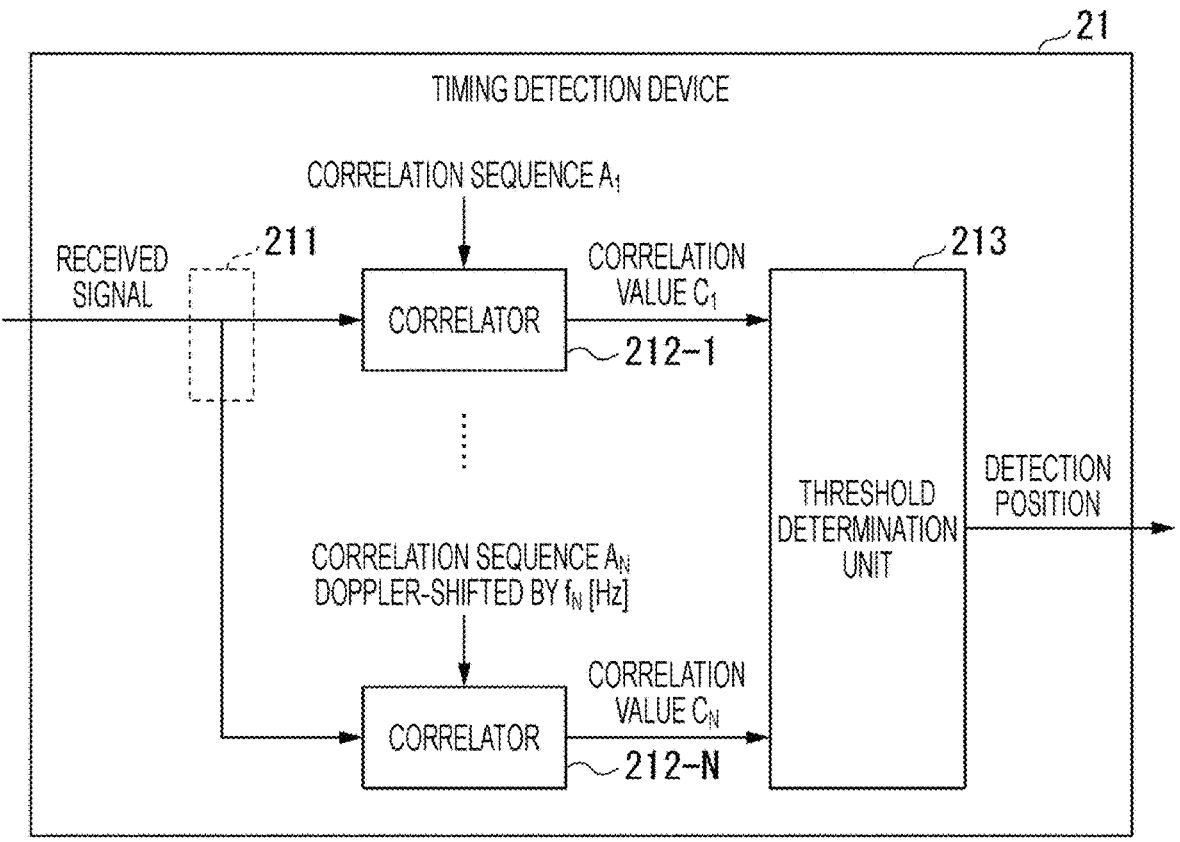
FIG. 2 is a block diagram illustrating a configuration of a timing detection device according to an embodiment.

Next, the timing detection device 21 according to the present embodiment will be described. FIG. 2 is a diagram illustrating a configuration of the timing detection device 21. The timing detection device 21 includes a branching unit 211, N (N is an integer of 2 or more) correlators 212, and a threshold determination unit 213. The N correlators 212 are referred to as correlators 212-1 to 212-N, respectively.

The branching unit 211 branches the received signal into N branches, and inputs the N-branched received signals to the correlators 212-1 to 212-N, respectively. A correlator 212-$n$ ($n$ is an integer of 1 or more and N or less) calculates a correlation value $C_n$ between the received signal and a correlation sequence $A_n$ obtained by applying Doppler shift of a frequency shift amount $f_n$ [Hz] on the correlation sequence A. The frequency shift amounts $f_1$ to $f_N$ are different values. Any one of the frequency shift amounts $f_n$ may be 0. For example, it is assumed that the frequency shift amount $f_1$ of a correlator 212-1 is set to 0. In this case, the correlation sequence A is used as it is as the correlation sequence $A_1$. In the present embodiment, a normalized SNR is used as the correlation value $C_n$.

The threshold determination unit 213 detects the reception of a physical frame in a case where any one of the correlation values $C_1$ to $C_N$ calculated respectively by the correlators 212-1 to 212-N exceeds the threshold. The threshold determination unit 213 outputs the received signal and the detection position of the physical frame to the demodulation device 22.

Figure 3:
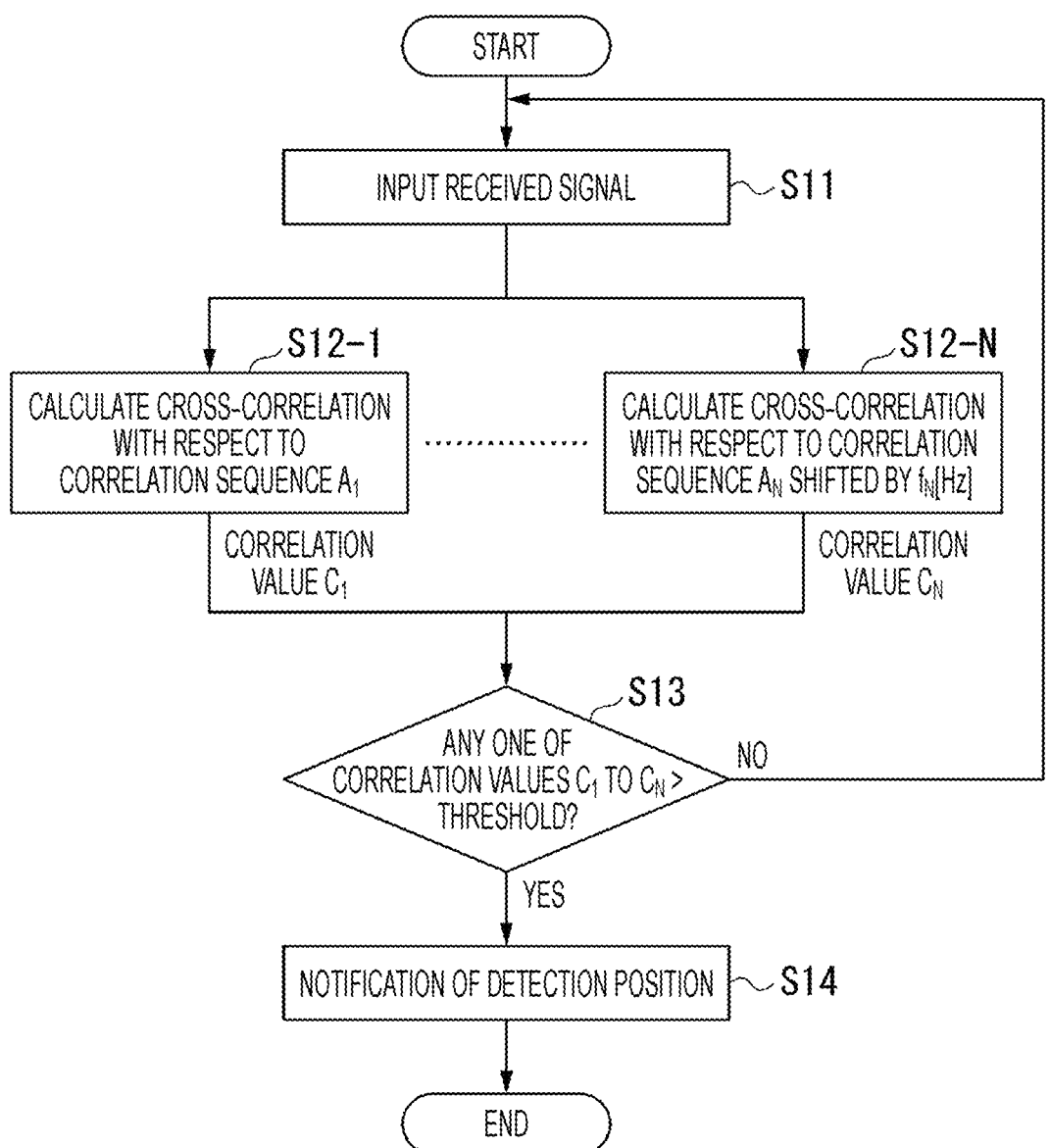
FIG. 3 is a flowchart illustrating reception timing detection processing by a timing detection device according to an embodiment.

FIG. 3 is a flowchart illustrating reception timing detection processing by the timing detection device 21. The branching unit 211 inputs the received signal received by the antenna (step S11). The branching unit 211 branches the received signal into N branches, and inputs the N-branched received signals to the correlators 212-1 to 212-N, respectively.

The correlator 212-n calculates a correlation value $C_n$ between a portion from the head of the received signal to the length of the correlation sequence A and a correlation sequence An obtained by applying $f_n$ [Hz] Doppler shift on a known correlation sequence A (step S12-n). Here, the correlator 212-1 uses the correlation sequence A as it is as the correlation sequence $A_1$. The correlator 212-n outputs the calculated correlation value $C_n$ to the threshold determination unit 213.

The threshold determination unit 213 inputs the correlation values $C_1$ to $C_N$ calculated by the correlators 212-1 to 212-N in steps S12-1 to S12-N, respectively. The threshold determination unit 213 determines whether any one of the correlation values $C_1$ to $C_N$ exceeds the threshold or not (step S13).

When determining that all of the correlation values $C_1$ to $C_N$ are equal to or less than the threshold (step S13: NO), the threshold determination unit 213 repeats the processing from step S11 for a received signal at the next timing. When determining that any one of the correlation values $C_1$ to $C_N$ exceeds the threshold (step S13: YES), the threshold determination unit 213 detects the reception of the physical frame. In a case where the correlation sequence is located the head of the physical frame, the threshold determination unit 213 notifies the demodulation device 22 of the head position of the received signal inputted in step S11 as the detection position of the physical frame (step S14).

As described above, the timing detection device 21 calculates the cross-correlation between the received signal and the Doppler-shifted correlation sequence in parallel in addition to the cross-correlation between the received signal and the known correlation sequence. As a result, it is possible to detect the Doppler-shifted received signal without sacrificing the detection accuracy.

Next, a method of calculating, by the shift amount calculation devices 23, the frequency shift amounts set respectively for the correlators 212-1 to 212-N of the timing detection device 21 will be described.

First Calculation Method

In a first calculation method, a Doppler frequency that cannot be detected can be eliminated. Since the Doppler frequency changes according to the moving speed, it can be said that a moving speed at which detection is impossible can be eliminated.

It is assumed that M denotes a sequence length of a correlation sequence, $f_d$ denotes a Doppler frequency, $T_s$ denotes a symbol rate, $\sigma_s^2$ denotes signal power of a received signal, and $\sigma_n^2$ denotes noise power of a received signal. The Doppler frequency is the amount of change between a frequency subjected to the Doppler effect and a frequency before being subjected to the Doppler effect. The signal power $S(f_d)$ at the time of received signal detection is expressed by the following Expression (1).

[Math. 1]

Signal power at the time of detection $S(f_d) =$     (1)

$$\sigma_s^2 \frac{\sin^2(\pi M f_d T_s)}{\sin^2(\pi f_d T_s)} = \sigma_s^2 S'(f_d)$$

Expression (1) represents a value of a case where a correlation sequence having a Doppler shift amount of 0 is used. The noise power $N(f_d)$ at the time of physical frame reception detection is expressed by the following Expression (2).

[Math. 2]

Noise power at the time of detection $N(f_d) = M\sigma_n^2$     (2)

The SNR at the time of physical frame reception detection is calculated by the following Expression (3) using Expressions (1) and (2).

[Math. 3]

$$SNR \text{ at the time of detection: } \frac{S(f_d)}{N(f_d)} = \frac{\sigma_s^2}{\sigma_n^2} \times \frac{S'(f_d)}{M} = SNR \times \frac{S'(f_d)}{M} \quad (3)$$

It is assumed that the Doppler frequency $f_d$ is expressed by the following Expression (4).

[Math. 4]

$$f_d = \frac{k}{MT_s}, \text{ (Integer excluding } k \in 0) \quad (4)$$

Figure 4:
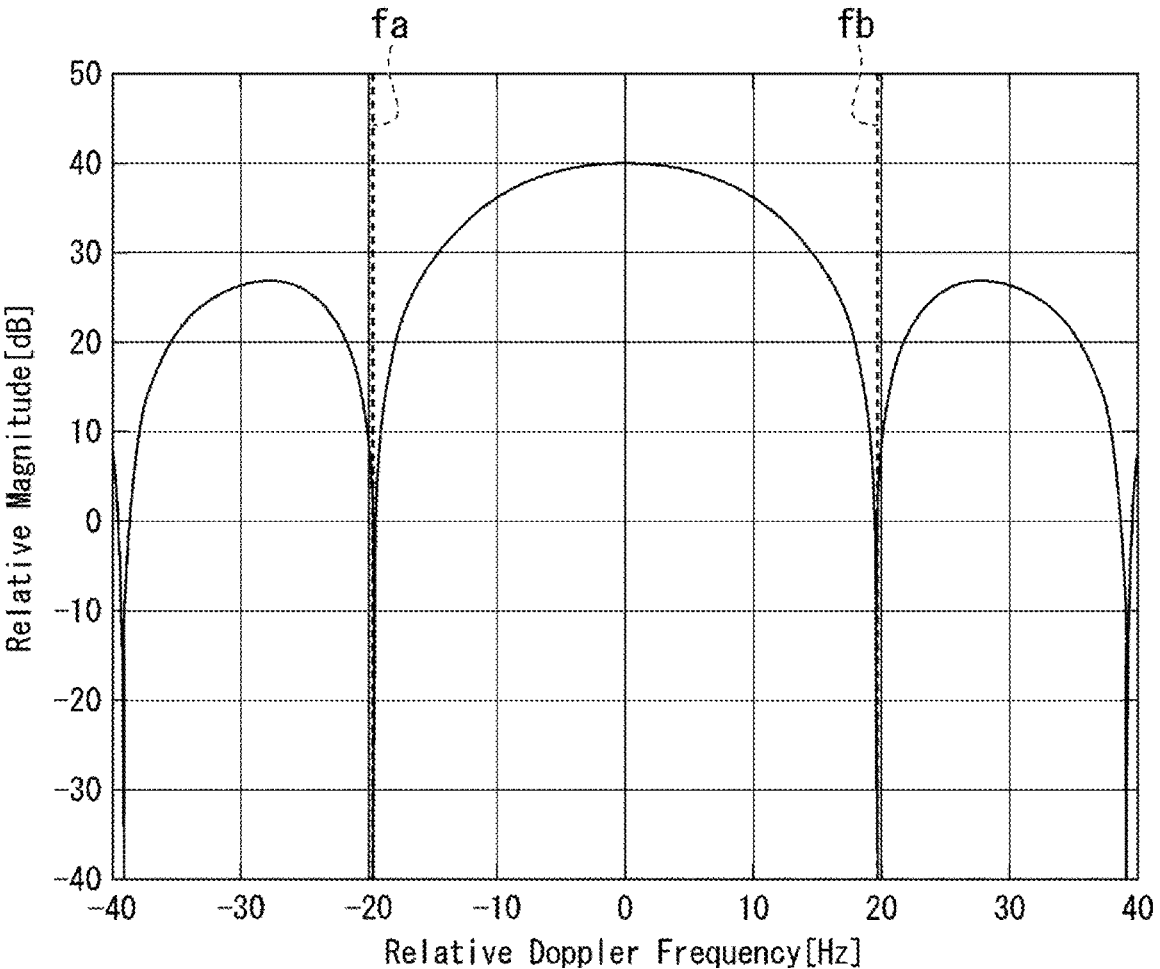
FIG. 4 is a diagram illustrating a relationship between SNR and a Doppler shift amount.

In this case, the signal power is expressed as $S(f_d)=0$. That is, in a case where the Doppler frequency is expressed as $f_d = k/(MT_s)$ [Hz], the SNR at the time of physical frame reception detection becomes 0, and thus signal detection cannot be performed. FIG. 4 is a diagram illustrating the relation between a correlation value and a Doppler shift amount at the time of physical frame detection. At the Doppler shift amounts fa and fb, the SNR, which is a correlation value, is 0, and therefore, signal detection is impossible. Therefore, the shift amount calculation device 23 shifts the Doppler frequency by $f_d=1/(MT_s)$ [Hz] and sets the result for each correlator 212. That is, the correlators 212-1 to 212-N calculate correlation values with respect to the received signals by using correlation sequences Doppler-shifted by $f_d=1/(MT_s)$. As a result, it is possible to eliminate the Doppler frequency at which SNR=0 is satisfied.

As described above, in the first calculation method, each of the plurality of types of Doppler shift amounts is set to any value obtained by multiplying the reciprocal $1/(MT_s)$ of the product $MT_s$ of the sequence length M of the correlation sequence and the symbol rate $T_s$ of the physical frame by an integer. Note that the number of sequences M of the correlation sequence is determined according to the range of the moving speed assumed for the communication apparatus including the transmitter 10 and the receiver 20, that is, the Doppler shift amount assumed from the range of the moving speed. Moreover, the detection threshold is set on the basis of a receiver operating characteristic (ROC) according to a risk rate (significance level) required by the system and detection power.

Second Calculation Method

The shift amount calculation device 23 determines the frequency shift amount by the following procedure. According to this method, the SNR of the lower detection limit can be secured.

(Procedure 1) The shift amount calculation device 23 generates a correlation sequence A of a Doppler frequency, which is 0, and sets the correlation sequence A as a correlation sequence A1. The shift amount calculation device 23 sets the correlation sequence A1 for the correlator 212-1. This corresponds to regarding one Doppler shift amount (here, 0) among a plurality of types of Doppler shift amounts as a reference and setting a correlation sequence of a reference Doppler shift amount for the correlator 212-1.

(Procedure 2) The shift amount calculation device 23 determines a detection threshold TH for the received signal of the Doppler frequency, which is 0, on the basis of the general ROC. The shift amount calculation device 23 obtains an SNR at the detection threshold TH of the received signal with the Doppler frequency, which is 0, and sets the SNR as $C_{min}$.

(Procedure 3) When receiving the received signal in which the correlation sequence is set at the head of the physical frame, the shift amount calculation device 23 obtains the Doppler frequency$\pm f_{d1}$ that satisfies the condition expressed in the following Expression (5).

[Math. 5]

$$\pm f_{d1}, \text{ such that } \frac{S(f_d)}{N(f_d)} = C_{min}, \left(-\frac{1}{MT_s} < f_d < +\frac{1}{MT_s}\right) \quad (5)$$

That is, the ratio of the signal power S ($f_d$) and the noise power N ($f_d$) of the received signal calculated using the correlation sequence of the Doppler frequency$\pm f_{d1}$ matches the ratio $C_{min}$ of the signal power and the noise power of the received signal at the detection threshold calculated using the correlation sequence of the reference Doppler shift amount.

(Procedure 4) The shift amount calculation device 23 sets the correlation sequences A2 and A3 obtained by shifting the correlation sequence A1 by the Doppler frequency$\pm f_{d1}$ respectively for the correlators 212-2 and 212-3. Furthermore, the shift amount calculation device 23 sets the correlation sequences A4 and A5 shifted by the Doppler frequency$\pm 2 \times f_{d1}$ respectively for the correlators 212-4 and 212-5. Hereinafter, the shift amount calculation device 23 repeats up to the correlator 212-N. As a result, the plurality of types of shift amounts have values shifted by the Doppler frequency $f_{d1}$.

Figure 5:
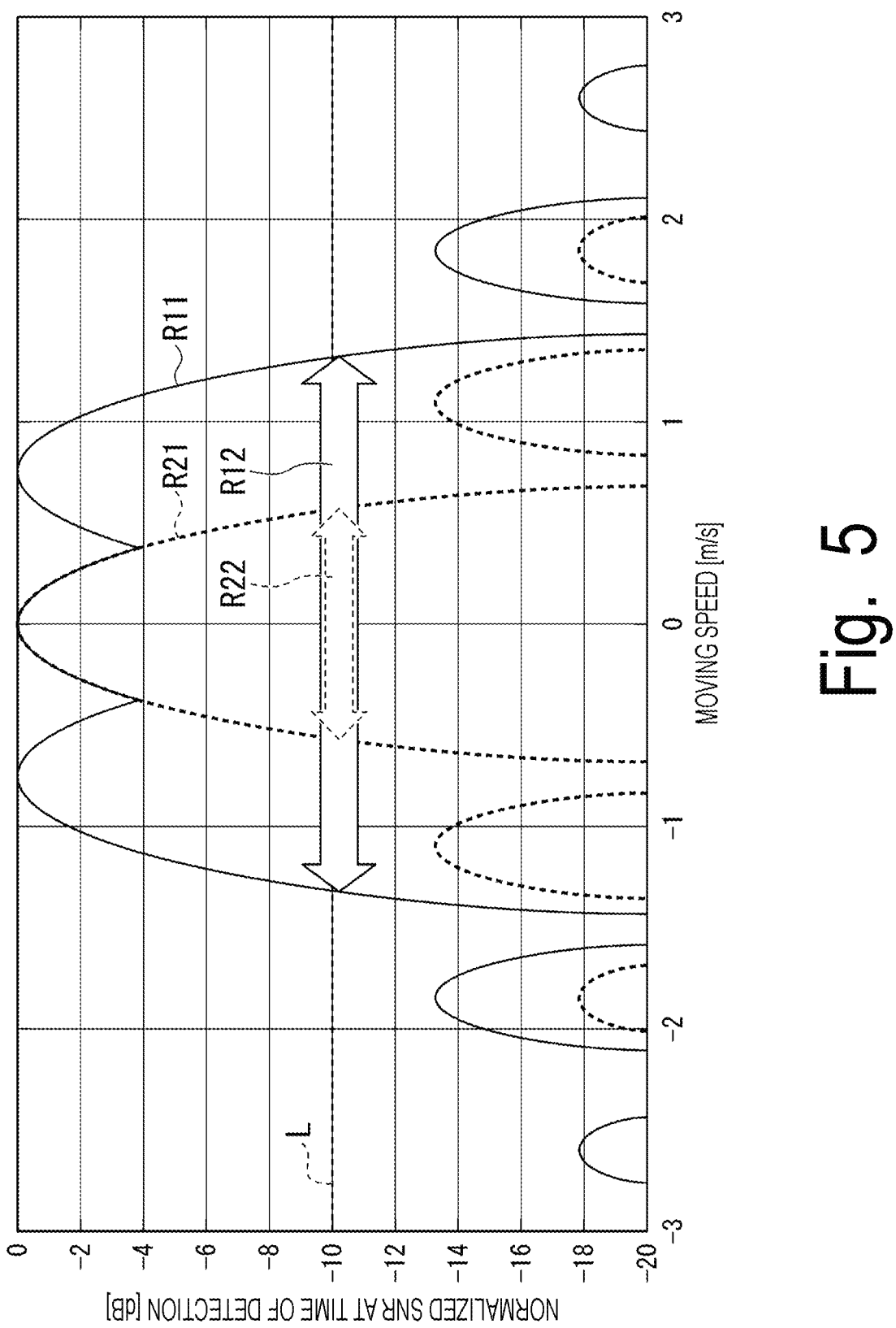
FIG. 5 is a diagram illustrating detection performance of a timing detection device according to an embodiment.
Figure 6:
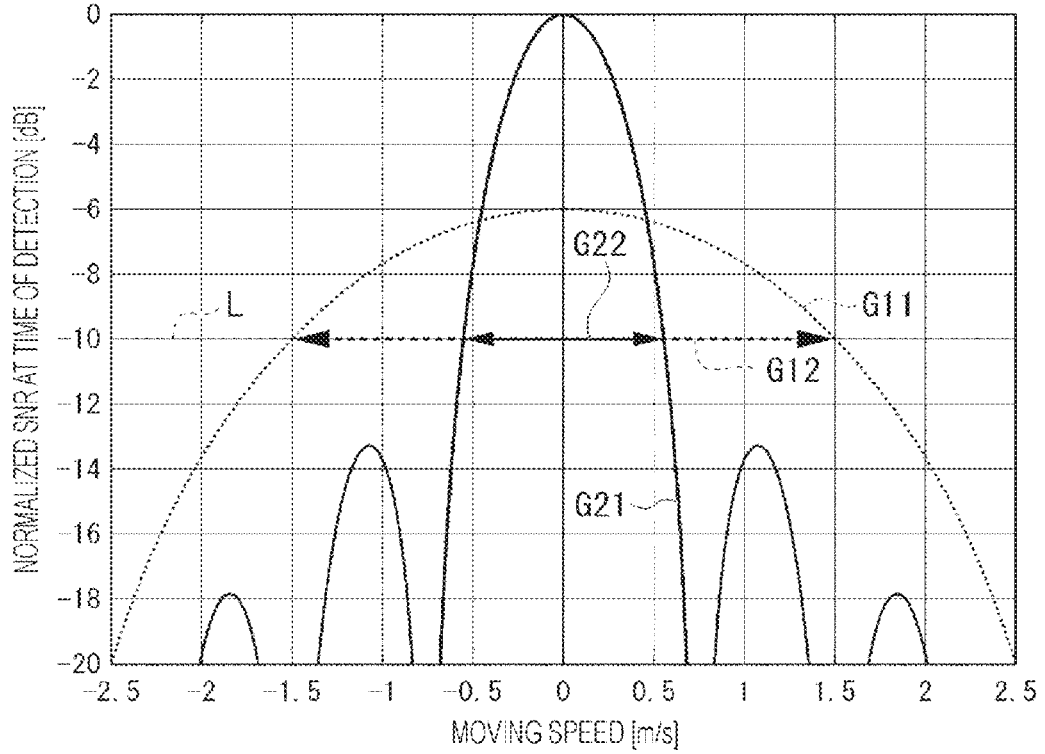
FIG. 6 is a diagram illustrating detection performance of a conventional technology.

FIG. 5 is a diagram illustrating detection performance of the timing detection device 21 obtained by computer simulation. FIG. 5 also illustrates detection performance of the conventional timing detection device 91 for comparison. In this simulation, the correlation sequence length of the physical frame transmitted from the transmitter 10 is set to 100 ms, and the carrier frequency is set to 20 kHz. Moreover, the timing detection device 21 includes three correlators 212, the correlator 212-1 uses a correlation sequence shifted by 0 Hz, the correlator 212-2 uses a correlation sequence shifted by 10 Hz, and the correlator 212-3 uses a correlation sequence shifted by-10 Hz. Moreover, the correlator 911 of the timing detection device 91 uses a correlation sequence shifted by 0 Hz. Moreover, the detectable SNR at the time of detection was set to −10 dB.

Reference sign L denotes a detectable level. In a case where the SNR is higher than the detectable level L, the reception of the physical frame can be detected. R11 denotes a detected SNR in the correlator 212 of the present embodiment, and R12 denotes a detectable range in the correlator 212 of the present embodiment. R21 denotes a detected SNR in a conventional correlator 911, and R22 denotes a detectable range in the conventional correlator 911. With reference to FIG. 5, according to the present embodiment, the range of the moving speed at which the physical frame can be detected is widened, and it can be seen that the frame detection accuracy in the mobile environment can be improved without sacrificing the sequence length.

Some of the functions of the receiver 20 in the above-described embodiment may be implemented by a processor such as a central processing unit (CPU) or a graphics processing unit (GPU) reading and executing a program from a recording medium such as a memory. Moreover, some of the functions of the receiver 20 may be implemented by using hardware such as an application specific integrated circuit (ASIC), a programmable logic device (PLD), or a field programmable gate array (FPGA).

According to the above-described embodiment, the communication system includes a transmission apparatus and a receiving apparatus. For example, the transmission apparatus corresponds to the transmitter 10 in the embodiment, and the receiving apparatus corresponds to the receiver 20 in the embodiment. The transmission apparatus intermittently transmits a physical frame of a transmitted signal. The receiving apparatus includes a correlation calculation unit and a determination unit. The correlation calculation unit corresponds to, for example, the correlator 212 of the embodiment. The correlation calculation unit calculates a correlation between the received signal and each of the correlation sequences subjected to Doppler shift of a plurality of types of shift amounts. The received signal may be a signal transmitted underwater. The determination unit corresponds to, for example, the threshold determination unit 213 of the embodiment. The determination unit determines that the physical frame has been received in a case where any one of the calculation results obtained by the correlation calculation unit exceeds the threshold.

Each of the plurality of types of shift amounts is any value obtained by multiplying a reciprocal $(1/MT_s)$ of a product $MT_s$ of the sequence length M of the correlation sequence and the symbol rate $T_s$ of the physical frame by an integer.

Alternatively, the plurality of types of shift amounts are values shifted by a predetermined Doppler frequency $f_{d1}$. In a case where one of the plurality of types of shift amounts is regarded as a reference, a ratio of the signal power $S(f_d)$ and the noise power $N(f_d)$ of the received signal calculated using the correlation sequence of the predetermined Doppler frequency $f_{d1}$ matches an SNR (e.g., corresponding to $C_{min}$ of the embodiment) that is a ratio of the signal power and the noise power of the received signal at the detection threshold calculated using the correlation sequence of the reference shift amount.

Although the embodiment of the present invention has been described in detail with reference to the drawings, specific configurations are not limited to the present embodiment and include design and the like within a scope not departing from the gist of the present invention.

REFERENCE SIGNS LIST

1 Communication system
10 Transmitter
20 Receiver
21, 91 Timing detection device
22 Demodulation device
23 Shift amount calculation device
211 Branching unit
212-1 to 212-N, 911 Correlator
213, 912 Threshold determination unit
911 Correlator

The invention claimed is:

1. A timing detection method comprising:
intermittently transmitting, by a transmission apparatus, a physical frame of a transmitted signal;
calculating, by a receiving apparatus, a correlation between a received signal and each of correlation sequences subjected to Doppler shift of a plurality of types of shift amounts; and
determining, by the receiving apparatus, that the physical frame has been received in a case where any one of calculation results exceeds a threshold,
wherein each of the plurality of types of shift amounts is any value obtained by multiplying a reciprocal of a product of a sequence length of a correlation sequence and a symbol rate of the physical frame by an integer.

2. A timing detection method comprising:
calculating a correlation between a received signal having been transmitted from a transmission apparatus that intermittently transmits a physical frame of a transmitted signal and each of correlation sequences subjected to Doppler shift of a plurality of types of shift amounts; and
determining that the physical frame has been received in a case where any one of calculation results exceeds a threshold,
wherein each of the plurality of types of shift amounts is any value obtained by multiplying a reciprocal of a product of a sequence length of a correlation sequence and a symbol rate of the physical frame by an integer.

3. A communication system comprising a transmission apparatus and a receiving apparatus,
wherein the transmission apparatus intermittently transmits a physical frame of transmitted signal, and
the receiving apparatus includes:
a correlation calculation circuitry that calculates a correlation between a received signal and each of correlation sequences subjected to Doppler shift of a plurality of types of shift amounts; and
a determination circuitry that determines that the physical frame has been received in a case where any one of calculation results obtained by the correlation calculation circuitry exceeds a threshold,
wherein each of the plurality of types of shift amounts is any value obtained by multiplying a reciprocal of a product of a sequence length of a correlation sequence and a symbol rate of the physical frame by an integer.

4. A receiving apparatus comprising:
a correlation calculation circuitry that calculates a correlation between a received signal having been transmitted from a transmission apparatus that intermittently transmits a physical frame of a transmitted signal and each of correlation sequences subjected to Doppler shift of a plurality of types of shift amounts; and
a determination circuitry that determines that the physical frame has been received in a case where any one of calculation results obtained by the correlation calculation circuitry exceeds a threshold,
wherein each of the plurality of types of shift amounts is any value obtained by multiplying a reciprocal of a product of a sequence length of a correlation sequence and a symbol rate of the physical frame by an integer.

5. The receiving apparatus according to claim 4,
wherein the plurality of types of shift amounts are values shifted by a predetermined Doppler frequency, and
a ratio of signal power and noise power of a received signal calculated using a correlation sequence of the predetermined Doppler frequency matches a ratio of signal power and noise power of a received signal at a detection threshold calculated using a correlation sequence of a reference shift amount in a case where one of the plurality of types of shift amounts is regarded as the reference shift amount.

6. The receiving apparatus according to claim 4,
wherein the received signal has been transmitted underwater.

* * * * *